(12) United States Patent
Nunn et al.

(10) Patent No.: US 8,881,249 B2
(45) Date of Patent: Nov. 4, 2014

(54) SCALABLE AND AUTOMATED SECRET MANAGEMENT (71) Applicant: Microsoft Corporation, Redmond, WA (US)

(72) Inventors: James Nunn, Everett, WA (US); Michael Friedman, Redmond, WA (US); Andrey Lukyanov, Redmond, WA (US); Rajmohan Rajagopalan, Redmond, WA (US); Rage Hawley, Redmond, WA (US); Shane Brady, Seattle, WA (US); Bryan Atwood, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/712,688

(22) Filed: Dec. 12, 2012

(65) Prior Publication Data

US 2014/0165167 A1 Jun. 12, 2014

(51) Int. Cl.
*G06F 7/04* (2006.01)
*G06F 21/45* (2013.01)

(52) U.S. Cl.
CPC .................................... *G06F 21/45* (2013.01)
USPC ............................................. 726/6; 713/182

(58) Field of Classification Search
None
See application file for complete search history.

(56) References Cited

U.S. PATENT DOCUMENTS

| 5,423,044 | A | 6/1995 | Sutton |
|---|---|---|---|
| 5,564,016 | A | 10/1996 | Korenshtein |
| 5,911,143 | A | 6/1999 | Deinhart et al. |
| 6,151,643 | A | 11/2000 | Cheng et al. |
| 6,335,972 | B1 | 1/2002 | Chandersekaran et al. |
| 6,678,826 | B1 | 1/2004 | Kelly et al. |
| 6,694,437 | B1 | 2/2004 | Pao et al. |
| 6,804,773 | B1 | 10/2004 | Grigsby et al. |
| 6,978,367 | B1 | 12/2005 | Hind et al. |
| 7,205,883 | B2 | 4/2007 | Bailey |
| 7,426,654 | B2 | 9/2008 | Adams, Jr. et al. |
| 7,526,685 | B2 | 4/2009 | Noy et al. |
| 7,630,480 | B2 | 12/2009 | Fleck et al. |
| 7,680,822 | B1 | 3/2010 | Vyas et al. |
| 7,698,430 | B2 | 4/2010 | Jackson |
| 7,702,736 | B2 | 4/2010 | Ouchi |

(Continued)

OTHER PUBLICATIONS

U.S. Office Action dated Jul. 2, 2013 cited in U.S. Appl. No. 13/052,788.

(Continued)

*Primary Examiner* — Fikremariam A Yalew
(74) *Attorney, Agent, or Firm* — Louise Bowman; Jim Ross; Micky Minhas (57) ABSTRACT

A secret (e.g. a password, key, certificate) is automatically generated by a system. For example, at the time of deployment of a computing machine, a password may be generated and securely stored by the system with other secrets. The password may be used by the system to perform various operations (e.g. configuring the machine, . . . ). When a secret is requested by a user to access a resource, a secret is provided to the user. Once the secret has been utilized by the user, the secret is reset and replaced with a newly generated secret. All/portion of the secrets may also be automatically regenerated. For example, when a breach occurs and/or is suspected, each of the secrets may be replaced with newly generated secrets and securely stored. Auditing and reporting may also be provided (e.g. each request/access to a secret is logged).

19 Claims, 8 Drawing Sheets

(56) References Cited

U.S. PATENT DOCUMENTS

| | | |
|---|---|---|
| 7,734,670 B2 | 6/2010 | Poozhiyil et al. |
| 7,831,833 B2 | 11/2010 | Gaylor et al. |
| 7,950,051 B1* | 5/2011 | Spitz et al. .................. 726/6 |
| 7,992,008 B2* | 8/2011 | Ashok et al. ................. 713/183 |
| 8,046,558 B2 | 10/2011 | Ghose |
| 8,195,488 B1 | 6/2012 | Taix et al. |
| 8,201,224 B1 | 6/2012 | Spertus |
| 8,296,827 B2 | 10/2012 | Paganetti et al. |
| 8,310,923 B1 | 11/2012 | Nordstrom et al. |
| 8,438,647 B2 | 5/2013 | Jevans |
| 8,458,455 B2* | 6/2013 | Anderson et al. ............ 713/156 |
| 8,458,779 B2* | 6/2013 | Valentine et al. ................. 726/6 |
| 8,839,257 B2 | 9/2014 | Lukyanov et al. |
| 2001/0021926 A1 | 9/2001 | Schneck et al. |
| 2002/0026592 A1 | 2/2002 | Gavrila et al. |
| 2002/0035521 A1 | 3/2002 | Powers |
| 2002/0147801 A1 | 10/2002 | Gullotta et al. |
| 2003/0115148 A1 | 6/2003 | Takhar |
| 2003/0139962 A1 | 7/2003 | Nobrega et al. |
| 2005/0050354 A1 | 3/2005 | Gociman |
| 2005/0154744 A1 | 7/2005 | Morinville |
| 2005/0193041 A1 | 9/2005 | Bourbonnais et al. |
| 2006/0005048 A1 | 1/2006 | Osaki et al. |
| 2006/0048224 A1 | 3/2006 | Duncan et al. |
| 2006/0137007 A1 | 6/2006 | Paatero et al. |
| 2006/0168079 A1 | 7/2006 | Shen et al. |
| 2006/0184675 A1 | 8/2006 | Salmre et al. |
| 2006/0242690 A1 | 10/2006 | Wolf et al. |
| 2006/0265599 A1 | 11/2006 | Kanai |
| 2007/0028293 A1 | 2/2007 | Boerries et al. |
| 2007/0094334 A1 | 4/2007 | Hoffman et al. |
| 2007/0101434 A1 | 5/2007 | Jevans |
| 2007/0124361 A1 | 5/2007 | Lowry et al. |
| 2007/0180100 A1 | 8/2007 | Biggs et al. |
| 2007/0185875 A1 | 8/2007 | Chang et al. |
| 2007/0192416 A1 | 8/2007 | Gupta |
| 2007/0250920 A1 | 10/2007 | Lindsay |
| 2007/0289019 A1 | 12/2007 | Lowrey |
| 2007/0294258 A1 | 12/2007 | Caldwell et al. |
| 2008/0098485 A1 | 4/2008 | Chiou |
| 2008/0103916 A1 | 5/2008 | Camarador et al. |
| 2008/0123854 A1 | 5/2008 | Peel et al. |
| 2008/0140778 A1 | 6/2008 | Banavar et al. |
| 2008/0154774 A1 | 6/2008 | Dennison et al. |
| 2008/0155685 A1 | 6/2008 | Beilinson et al. |
| 2008/0195936 A1 | 8/2008 | White et al. |
| 2008/0276098 A1 | 11/2008 | Florencio et al. |
| 2008/0287121 A1 | 11/2008 | Ebrom et al. |
| 2008/0320310 A1 | 12/2008 | Florencio et al. |
| 2009/0048881 A1 | 2/2009 | Keane et al. |
| 2009/0055822 A1 | 2/2009 | Tolman et al. |
| 2009/0094667 A1 | 4/2009 | Habeck et al. |
| 2009/0104888 A1* | 4/2009 | Cox ............................ 455/410 |
| 2009/0119541 A1 | 5/2009 | Inoue et al. |
| 2009/0193407 A1 | 7/2009 | Lepeska |
| 2009/0210427 A1 | 8/2009 | Elder et al. |
| 2009/0249284 A1 | 10/2009 | Antosz et al. |
| 2009/0271451 A1 | 10/2009 | Young et al. |
| 2009/0319402 A1 | 12/2009 | Manistra et al. |
| 2009/0320088 A1 | 12/2009 | Gill et al. |
| 2009/0320107 A1* | 12/2009 | Corella ............................ 726/6 |
| 2009/0328023 A1 | 12/2009 | Bestland et al. |
| 2010/0005510 A1 | 1/2010 | Weber et al. |
| 2010/0011418 A1 | 1/2010 | Despain et al. |
| 2010/0017589 A1 | 1/2010 | Reed et al. |
| 2010/0023368 A1 | 1/2010 | Houba |
| 2010/0037056 A1 | 2/2010 | Follis et al. |
| 2010/0063950 A1 | 3/2010 | Joshi et al. |
| 2010/0064072 A1 | 3/2010 | Tang et al. |
| 2010/0087941 A1 | 4/2010 | Assaf et al. |
| 2010/0091318 A1 | 4/2010 | Ferlitsch |
| 2010/0169630 A1 | 7/2010 | Mirashrafi et al. |
| 2010/0185451 A1 | 7/2010 | Choi et al. |
| 2010/0188287 A1 | 7/2010 | Madsen et al. |
| 2010/0205421 A1 | 8/2010 | Campbell et al. |
| 2010/0212008 A1 | 8/2010 | Jaganathan et al. |
| 2010/0242041 A1 | 9/2010 | Plondke et al. |
| 2010/0257346 A1 | 10/2010 | Sosnosky et al. |
| 2010/0257579 A1 | 10/2010 | Karjoth et al. |
| 2010/0257596 A1 | 10/2010 | Ngo et al. |
| 2010/0278078 A1 | 11/2010 | Proulx et al. |
| 2011/0023107 A1* | 1/2011 | Chen et al. ...................... 726/12 |
| 2011/0078497 A1 | 3/2011 | Lyne et al. |
| 2011/0099552 A1 | 4/2011 | Avni et al. |
| 2011/0099616 A1 | 4/2011 | Mazur et al. |
| 2011/0126111 A1 | 5/2011 | Gill et al. |
| 2011/0191254 A1 | 8/2011 | Womack |
| 2011/0246426 A1 | 10/2011 | Cho |
| 2011/0247066 A1 | 10/2011 | Lee |
| 2011/0252404 A1 | 10/2011 | Park et al. |
| 2011/0289588 A1 | 11/2011 | Sahai et al. |
| 2011/0302632 A1 | 12/2011 | Garrett et al. |
| 2012/0016621 A1 | 1/2012 | Tan et al. |
| 2012/0096306 A1 | 4/2012 | Akirav et al. |
| 2012/0144234 A1 | 6/2012 | Clark et al. |
| 2012/0185911 A1 | 7/2012 | Polite et al. |
| 2012/0185933 A1 | 7/2012 | Belk et al. |
| 2012/0209884 A1 | 8/2012 | Mattsson et al. |
| 2012/0239822 A1 | 9/2012 | Poulson et al. |
| 2012/0246703 A1 | 9/2012 | MacLeod et al. |
| 2012/0259720 A1 | 10/2012 | Nuzzi |
| 2012/0266246 A1 | 10/2012 | Amit et al. |
| 2012/0317132 A1 | 12/2012 | Brady et al. |
| 2013/0024918 A1* | 1/2013 | Cramer et al. .................... 726/6 |
| 2013/0024947 A1* | 1/2013 | Holland et al. ................. 726/28 |
| 2013/0031070 A1 | 1/2013 | Ducharme et al. |
| 2013/0111260 A1 | 5/2013 | Reddy et al. |
| 2013/0132963 A1 | 5/2013 | Lukyanov et al. |
| 2013/0133024 A1 | 5/2013 | MacLeod et al. |
| 2013/0239166 A1 | 9/2013 | MacLeod et al. |

OTHER PUBLICATIONS

Chun-Ying Huang et al., Using one-time passwords to prevent password phishing attacks. J Network Computer Applications (2011), doi:10.1016/j.jnca. 2011.02.004, Journal of Network and Computer Applications, vol. 34, Issue 4, 10 pgs.

Dinei Florencio et al., One-Time Password Access to Any Server without Changing the Server, 11th International conference on Information Security '08, Taipei. Sep. 15, 2008, 16 pgs.

Joseph Bonneau et al., The Quest to Replace Passwords: A Framework for Comparative Evaluation of Web Authentication Schemes, IEEE Symposium on Security and Privacy (SP), 2012, May 20, 2012, 15 pgs.

Lockbox. Printed Nov. 20, 2012. Lockbox: Technology Platform, 3 pgs. http://www.lock-box.com/technology-platform.

Stoneware. Printed Nov. 21, 2012. Single Sign-on, 3 pgs. http://www.stone-ware.com/webnetwork/lenovo/sso.

U.S. Appl. No. 13/052,788, filed Mar. 21, 2011 entitled "Email-Based Automated Recovery Action in a Hosted Environment".

U.S. Appl. No. 13/154,660, filed Jun. 7, 2011, entitled "Instance-Based Command Execution, Approval, and Notification Framework".

U.S. Appl. No. 13/301,872, filed Nov. 22, 2011, entitled "Auto-Approval of Recovery Actions Based on an Extensible Set of Conditions and Policies".

U.S. Appl. No. 13/302,064, filed Nov. 22, 2011, entitled "Superseding of Recovery Actions Based on Aggregation of Requests for Automated Sequencing and Cancellation".

U.S. Appl. No. 13/413,078, filed Mar. 6, 2012, entitled "Operating Large Scale Systems and Cloud Service with Zero-Standing Elevated Permissions".

Huhns, M., et al.; "Service-Oriented Computing: Key Concepts and Principles"; IEEE Internet Computing Jan./Feb. 2005, IEEE Computer Society; 7 pages.

Wright, T.; "System Center Service Manager 2010 Release Candidate Released!!"; Microsoft Corporation; Mar. 3, 2010; 3 pages.

Kaufman, Charlie, et al.; "Windows Azure™ Security Overview"; Published Aug. 2010; 24 pgs., Obtained at: http://www.globalfoundationservices.com/security/documents/WindowsAzureSecurityOverview1_0Aug2010.pdf.

(56) References Cited

OTHER PUBLICATIONS

Publication entitled, "PCI DSS Compliance in the UNIX/LINUX Datacenter Environment"; Published Aug. 2009 by BeyondTrust Corporation; 19 pages. Obtained at: http://i.zdnet.com/whitepapers/BeyondTrust_PCIDSSComplianceintheUNIXLinuxDatacenterEnvironment.pdf.
Master Data Services Environment—Retrieved Date: Oct. 4, 2011, Available at: http://download.microsoft.com/download/5/9/F/59F1639E-EF57-4915-8848-EF1DC2157EBB/02%20MDS%20Environment.pdf.
Stanger, Mark; article entitled "Change Management Workflow Approval Scripts in Service-now.com" Published on Oct. 20, 2010. Available at: http://www.servicenowguru.com/scripting/change-management-workflow-approval-scripts-servicenowcom/.
"IBM Tivoli Business Continuity Process Manager"—Retrieved Date: Oct. 4, 2011. Available at: http://www-01.ibm.com/software/tivoli/products/business-continuity-process-mgr/features.html.
"Deployment Planning, Architecture, and Guidance on System Center Service Manager"—Retrieved Date: Oct. 4, 2011. Available at: http://technet.microsoft.com/en-us/library/gg281359.aspx.
"Change Management Process" Version 1.0—Published Date: May 1, 2006. Available at: http://its.uncg.edu/Service_Management/Change/ChangeManagementProcess.pdf.
Kadar, et al, article entitled "Automatic Classification of Change Requests for Improved IT Service Quality"—Published Date: Mar. 29, 2011. In proceedings of Annual SRII Global Conference, Mar. 29, 2011, pp. 430-439. Available at: http://ieeexplore.ieee.org/stamp/stamp.jsp?tp=&arnumber=5958118.
"Automating IT: SCSM, SCCM, SCOM, SCVMM, Opalis—Better Together"—Retrieved Date: Oct. 3, 2011. Available at: http://blogs.technet.com/b/servicemanager/archive/2010/08/25/automating-it-scsm-sccm-scom-scvmm-opalis-better-together.aspx.
"BMC Remedy Change Management 7.0 User's Guide"—Published Date: Jun. 2006; 410 pages. Available at: http://idbdocs.iadb.org/wsdocs/getdocument.aspx?docnum=35595995.
Batishchev, Alexander, M. article entitled, "Getting Elevated privileges on Demand Using C#," published Sep. 9, 2010; 4 pages. Available at: http://www.codeproject.com/KB/vista-security/ElevatedPrivilegesDemand.aspx.

U.S. Office Action dated Nov. 1, 2012 cited in U.S. Appl. No. 13/154,660.
U.S. Office Action dated Nov. 30, 2012 cited in U.S. Appl. No. 13/052,788.
U.S. Office Action dated Jan. 14, 2013 cited in U.S. Appl. No. 13/301,872.
U.S. Office Action dated Apr. 19, 2013 cited in U.S. Appl. No. 13/413,078.
U.S. Office Action dated May 2, 2013 cited in U.S. Appl. No. 13/154,660.
U.S. Final Office Action dated Sep. 24, 2013 cited in U.S. Appl. No. 13/413,078.
U.S. Office Action dated Sep. 30, 2013 cited in U.S. Appl. No. 13/154,660.
U.S. Final Office Action dated Sep. 30, 2013 cited in U.S. Appl. No. 13/301,872.
U.S. Office Action dated Dec. 17, 2013 cited in U.S. Appl. No. 13/052,788.
U.S. Office Action dated Jan. 30, 2014 cited in U.S. Appl. No. 13/302,064.
U.S. Office Action dated Feb. 24, 2014 cited in U.S. Appl. No. 13/413,078, 44 pgs.
U.S. Final Office Action dated Mar. 24, 2014 cited in U.S. Appl. No. 13/154,660, 31 pgs.
U.S. Office Action dated Apr. 22, 2014 cited in U.S. Appl. No. 13/301,872, 56 pgs.
U.S. Final Office Action dated May 20, 2014 cited in U.S. Appl. No. 13/052,788, 35 pgs.
U.S. Final Office Action dated Aug. 8, 2014 in U.S. Appl. No. 13/413,078, 56 pgs.
U.S. Final Office Action dated Aug. 27, 2014 in U.S. Appl. No. 13/301,872, 55 pgs.
U.S. Office Action dated Sep. 8, 2014 in U.S. Appl. No. 13/154,660, 36 pgs.
U.S. Office Action dated Sep. 9, 2014 in U.S. Appl. No. 13/052,788, 34 pgs.

\* cited by examiner

SCALABLE AND AUTOMATED SECRET MANAGEMENT

BACKGROUND

Security and privacy are concerns for many different software systems. These systems utilize secrets such as passwords, encryption keys, and certificates to assist in protecting access to resources such as computing devices, customer data and other information. Unauthorized access to resources of a service can cause significant disruption to the service.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A secret (e.g. a password, key, certificate) is automatically generated by a system. For example, at the time of deployment of a computing machine, a password may be generated and securely stored by the system with other secrets. The password may be used by the system to perform various operations (e.g. configuring the machine, . . . ). When a secret is requested by a user to access a resource, a secret is provided to the user. Once the secret has been utilized by the user, the secret is reset and replaced with a newly generated secret. For example, the secret may be replaced once the secret has: been used to access a machine; perform an operation; complete a task; expire after some time period (e.g. 10 minutes, 30 minutes, 1 hour, . . . ) and the like. All/portion of the secrets may also be automatically regenerated. For example, when a breach occurs and/or is suspected, each of the secrets may be replaced with newly generated secrets and securely stored. Auditing and reporting may also be provided (e.g. each request/access to a secret is logged).

DETAILED DESCRIPTION

Referring now to the drawings, in which like numerals represent like elements, various embodiment will be described.

Figure 1:
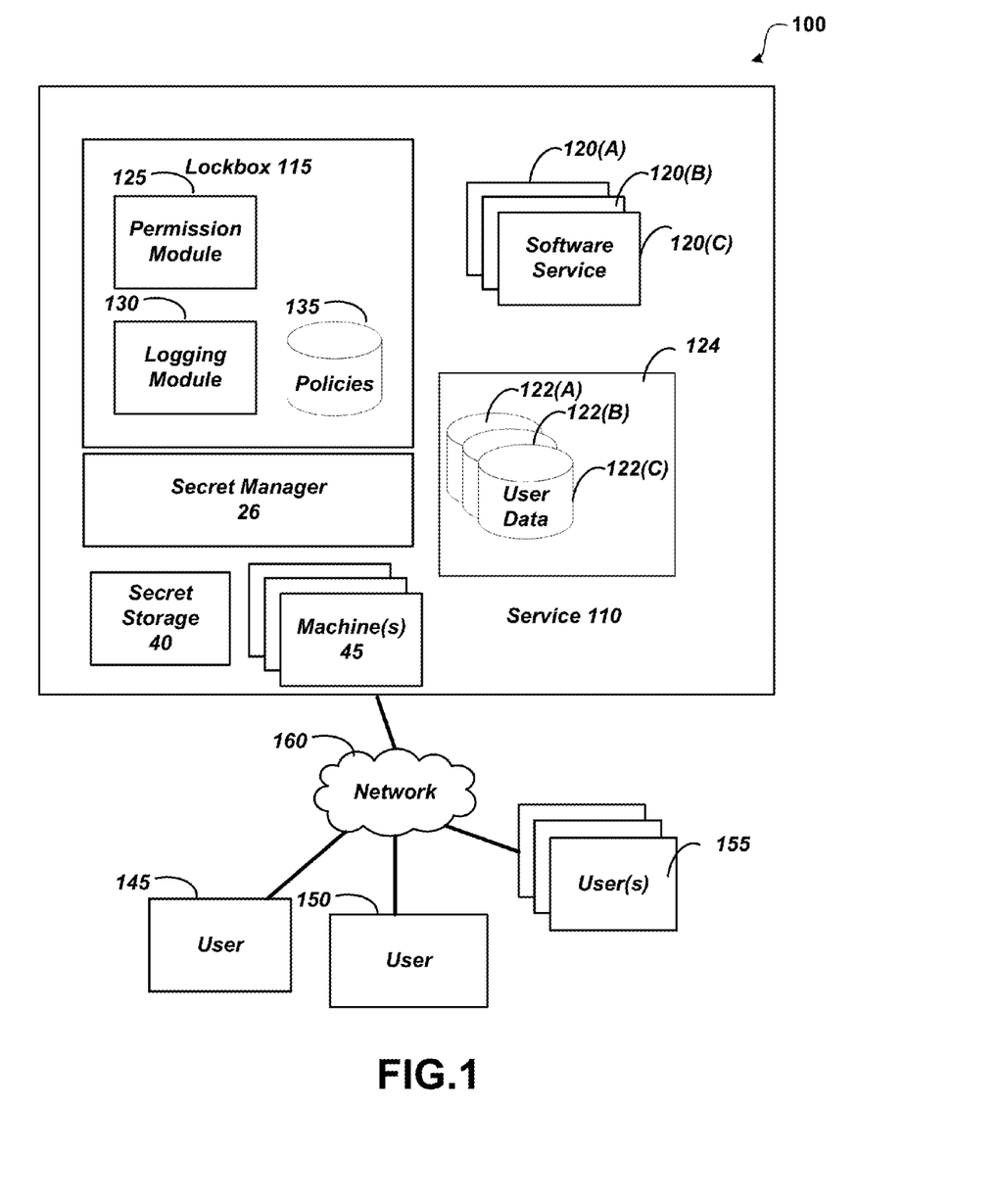
FIG. 1 shows a system for scalable and automated secret management.

FIG. 1 shows a system for scalable and automated secret management. As illustrated, system 100 includes service 110, network 160 and users 145, 150 and 155.

Service 110 may comprise a lockbox component 115, hosted software services 120(A)-(C) and user data storage components 122(A)-(C) associated with computing machines such as machines 45 and/or a multi-tenant application server 124 (e.g. a multi-tenant application server). Service 110 may be operative to execute other applications and/ or services (not shown). Lockbox component 115 may comprise a permission module 125, a logging/auditing module 130, and a permission policies 135. Service 110 may be operative to communicate with users (e.g. 140, 145 and 150) such as an offsite engineer, an onsite engineer, an administrator 150, and the like. The users may access service 110 via a network 160 using, for example, an electronic communications device such as a computer, laptop, slate, cellular and/or IP phone, tablet, game console and/or other device.

Service 110 may be configured for a local enterprise and/or a cloud service providing services for a number of tenants/ users. Administrative access to systems/machines used to provide cloud services may be regulated to help ensure that there is no unauthorized access or exposure to the customer generated data or other protected resources. Furthermore, full auditing and reporting of all administrator activity and/or access (e.g. to the secrets) may be provided. Such access management may be fully automated to grant, monitor, revoke and report access based on the needs of operating a large scale service and/or a complex on-premise system.

By default, authorized users who have access to perform various operations (e.g. configure/operate the service, debug issues, respond to escalations and incidents, . . . ) in the system may have limited security permissions until elevated permissions are needed to perform an operation. When an elevated access permission is needed (e.g. when making a change in the system, requesting a password, debugging of customer specific issues, and the like), the user may submit a request to an on-demand elevation system such as a lockbox for the requested action. A secret (e.g. a password) may be needed to access a resource.

The lockbox may evaluate the role of the requestor and the role group that they are requesting access to with a set of pre-defined policies. The lockbox may then make a decision either to automatically elevate and/or request explicit approval from an approval body as dictated by the policies. During elevation, the lockbox may stamp an attribute in the user object with an expiry time based on a requested interval. This lockbox may automatically de-elevate at a configured interval by default. The lockbox policies may also allow for elevation for a requested period of time. A de-elevate component of the lockbox may execute at configurable intervals looking for users to be de-elevated and/or secrets replaced and regenerated.

Secret manager 26 is configured to manage secrets for service 110. According to an embodiment, at the time of deployment of each computing machine (e.g. machines 45), a password is automatically generated and securely stored in secret storage 40 by secret manager 26. The password may be used by the system to perform various operations (e.g. configuring the machine, . . . ) without being disclosed to any users. When a secret is requested by a user, a secret is provided to the user when authorized (e.g. using lockbox 115). According to an embodiment, any secret provided to a user is for a one-time use and is only valid for a predetermined use (e.g. logging into a machine, performing a task, . . . ). Once the secret has been used by the user and/or expires, secret manager 26 resets the secret and replaces the secret with a newly generated secret. For example, the secret may be replaced once the secret has: been used to access a machine, perform some work, some time period has expired (e.g. 10 minutes, 30 minutes, 1 hour, . . . ) and the like.

Secret manager 26 may be configured to automatically/ manually regenerate secret(s). For example, when a breach is suspected/happens, all/portion of the secrets may be re-generated and securely stored. All/portion of the secret(s) stored and managed by secret manager 26 may also be manually regenerated in response to a request by an authorized user.

Auditing and reporting may also be provided (e.g. each request/access to a secret is logged). Lockbox 115 and secret manager 26 may record the activity relating to request/use/access to the secrets. In this way, a user may monitor/audit secret access and/or permission elevations.

Lockbox 115 may grant permissions at a granular level that segregates the duties and helps to ensure that malicious activity does not occur. For example, those with permissions to change a configuration that is potentially exposing customer data do not have permissions to wipe off the audit trail of such change. The lockbox may monitor account usage and may be configured to automatically disable: user accounts; inactive accounts and/or accounts associated with users who no longer have rights to access the services system. Lockbox 115 may also communicate with secret manager 26 to change all/portion of the secrets. More details regarding the secret management are provided below.

Figure 2:
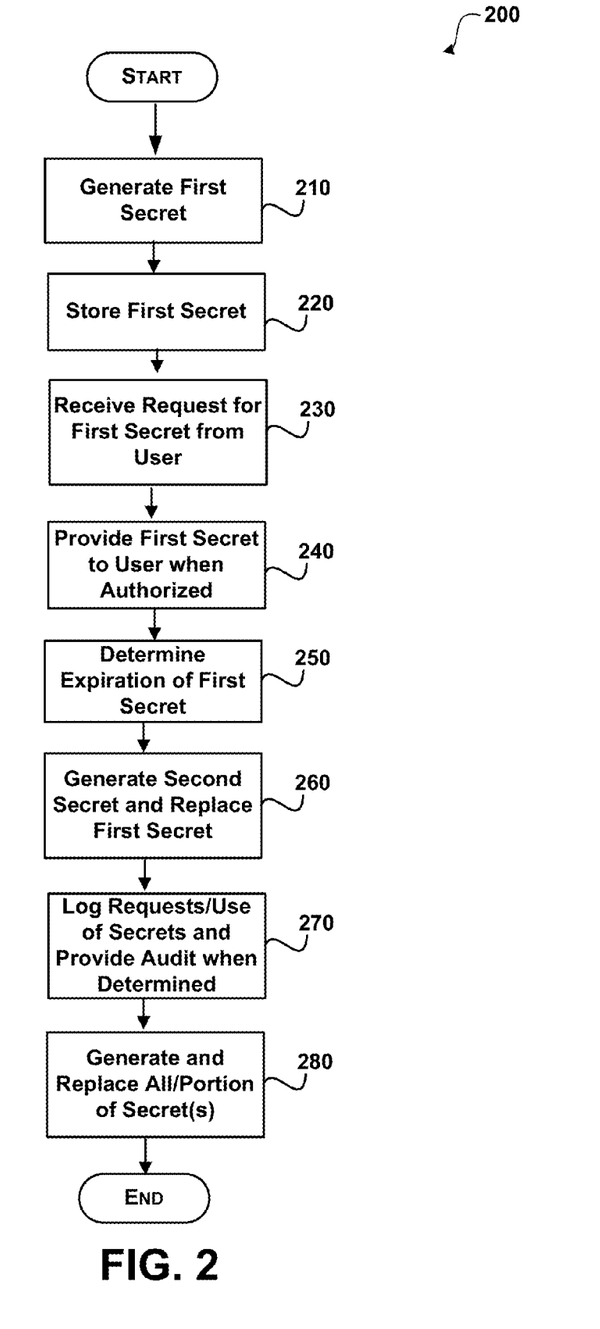
FIG. 2 illustrates a process for automatically generating secrets.
Figure 3:
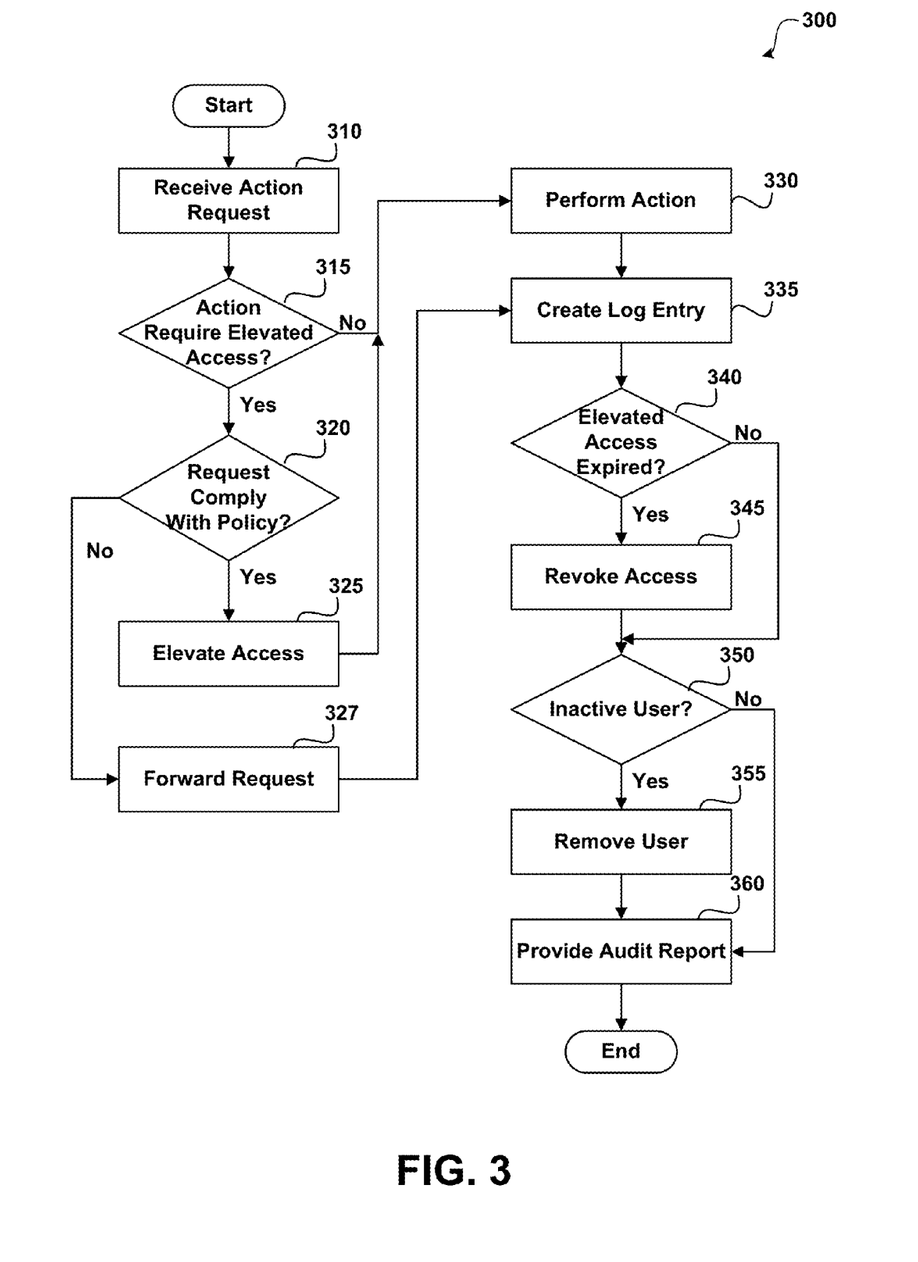
FIG. 3 illustrates a process for determining/elevating permissions and monitoring and auditing of secret management.

FIGS. 2 and 3 show illustrative processes for scalable and automated secret management. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 2 illustrates a process for automatically generating secrets.

After a start operation, the process moves to operation 210, where a secret (the "first" secret) is generated. The secret may be any secret that is used to access a resource (e.g. data/process/system . . . ) such as a password, a certificate, a key, and the like. According to an embodiment, a password is automatically generated for each machine when the machine is deployed in a service, such as a cloud service. In this way, each machine in a service is assigned a unique password thereby making it more difficult for a security breach of the entire service.

Flowing to operation 220, the secret (e.g. password, certificate, key) is securely stored. The secret may be stored with all/portion of the other generated secrets. For example, the secrets may be stored in a location accessible by a lockbox and/or secret manager that is used in managing the secrets. The secrets may be stored online/offline.

Moving to operation 230, a request is received from a user for a secret to access a resource. For example, a user may request a password to login to a machine of the service and/or access some other resource.

Transitioning to operation 240, the first secret is provided in to user when the user is authorized. For example, an authentication process (e.g. see FIG. 3 and related discussion) may be used to determine if a user is authorized to receive a secret to access the resource.

Transitioning to operation 250, a determination is made as to when the first secret has expired. The secret may expire based on the occurrence of an event and/or a predetermined time period. For example, the secret expires after a user completes a desired action involving the resource, logging onto the resource, accessing the resource, and the like. The secret may also expire after a time period expires (e.g. enough time to use the secret to access the resource and/or perform a desired operation) such as ten minutes, twenty minutes, thirty minutes, and the like. According to an embodiment, the time period is set to a time period less than a day. A user may also manually expire the secret (e.g. indicate that the secret is no longer needed).

Flowing to operation 260, a secret (the "second" secret) is generated. The first secret is replaced with the second secret and the first secret is no longer valid.

Moving to operation 280, each request/use of a secret is logged. For example, a lockbox may automatically record each request for a secret as well as when any user attempts to use a secret. This information may be used to provide an audit trail to a user to assist in managing the secrets.

Transitioning to operation 290, all/portion of the secrets may be replaced with newly generated secrets. For example, secrets may be replaced at the expiration of a time period (e.g. daily, weekly, monthly), upon the occurrence of a breach (attempted/suspected), and/or upon a manual request.

The process then moves to an end operation and returns to processing other actions.

FIG. 3 illustrates a process for determining/elevating permissions and monitoring and auditing of secret management.

After a start operation, process 300 flows to operation 310 where a computing device receives an action request from a user. For example, a user may attempt to run a debugging trace on a process associated with software service. To protect the data associated with the service, the access may not be available to an authorized user without using a secret.

Flowing to decision operation 315, a determination is made as to whether the user needs elevated access. For example, a user may have permissions to view a log entry, but restarting a software service, logging onto a machine, and the like may require an elevated permission and/or access to a secret.

In response to determining that the requested action requires the elevated permission and/or secret, the process flows to operation 320, where a determination is made as to whether the action request complies with permission policies (e.g. associated with a lockbox service). For example, the requested action received from a user may be forwarded to lockbox component and checked for compliance with at least one permission policy. Such policies may comprise checks for factors such as a user group criterion, a security flag criterion, an action scope criterion, a schedule criterion, and the like. For example, a user may belong to an "onsite" user group that allows greater automated elevation of permissions compared to a user requesting an action from offsite.

When the request complies with the policies, the elevated access is granted at operation 325. For example, the lockbox component may elevate the permissions allocated to a user in order to allow the requested action to be performed. This elevation may be for a limited duration, that may be defined, for example, by the permission policy, by a configuration setting associated with the software service, and/or by a configuration setting associated with the at least one user group. Such permissions may comprise a set of permissions associated with a task, such as the need to modify overall configuration data for a machine server and restart several core services (e.g., network and/or user management services) in order to install a new software service into production.

If the action request is determined not to comply with the permission policies, the process flows to operation 327 where the action request may be forwarded to at least one approval user. For example, lockbox component/secret manager may forward the request to an administrator for review.

After elevating the access at operation 325, or if the requested action is determined to not need elevated access at operation 315, the process may advance to operation 330 where the requested action is performed. For example, a user may be allowed to perform a debugging trace as allowed by the newly elevated permissions and/or a secret may be provided to the user to assist in performing the requested action.

Moving to operation 335, a log entry of the action request is made. The log entry may comprise when a secret is requested/provided to the user, whether the request resulted in automatic approval of the permissions elevation and/or whether the request was sent for administrator approval. The log entry may further comprise a record of data accessed by the requesting user while the elevated permissions were in force. Consistent with embodiments of the invention, users who receive elevated permissions that permit access to user data may be denied if they request an action to modify log entries associated with such access. Such denials may also be logged and/or forwarded to an authorized user (e.g. an administrator).

Transitioning to operation 340, a determination is made as to whether the elevated access has expired and the permissions revoked and/or a provided secret regenerated. For example, security policies may define a configurable length of time that such elevations are to remain in effect and/or the elevations may be changed after the requested action is performed.

In response to identifying a user that should have their elevated permission revoked, the process flows to operation 345 where the elevated permissions are revoked and returned to the permission level before granting access and/or regenerate the secret.

After revoking the elevated permissions at operation 345, or if no users were found to need permissions revoked at stage 340, the process moves to operation 350 where a determination is made as to whether a user in inactive. For example, a user who has been inactive for a configurable length of time or a user who is no longer employed by an organization associated with a service may be identified as candidates for removal.

In response to determining that the identified user should be removed, such as where the user is no longer associated with one of software services the process advances to operation 355 where the user is removed. For example, the user may be removed from the basic level user group and may have their access, including the ability to request actions, revoked.

Flowing to operation 360 an audit report may be delivered/shown to a user. For example, a user may be provided with an audit report comprising a list of the users who have been granted elevated permissions, requested a secret and/or been provided a secret. The process then flows to an end operation and returns to processing other actions.

Figure 4:
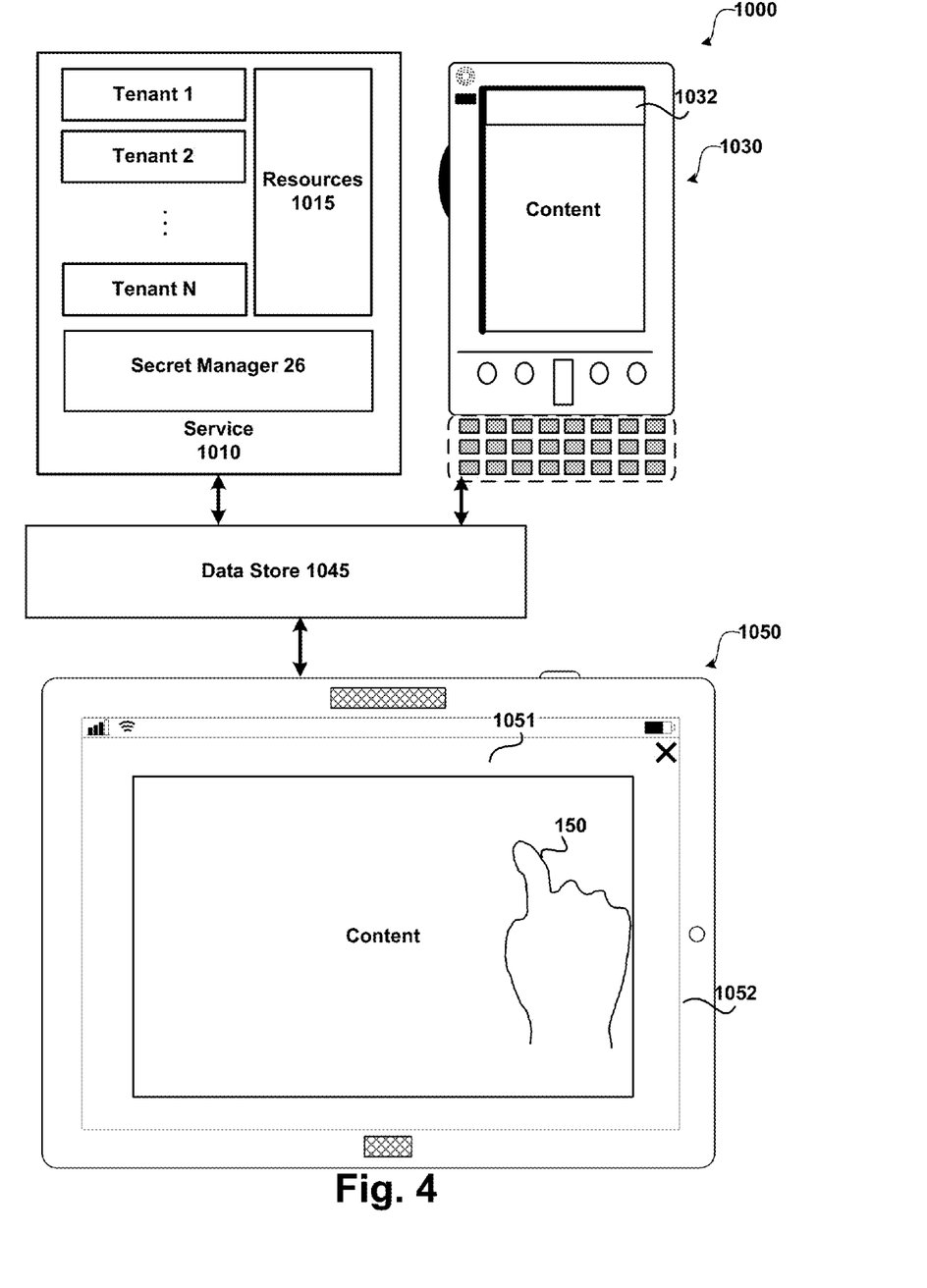
FIG. 4 illustrates an exemplary system for managing secrets.

FIG. 4 illustrates an exemplary system for managing secrets. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as productivity services (e.g. MICROSOFT OFFICE 365 or some other cloud based/online service that is used to interact with content (e.g. spreadsheets, documents, presentations, charts, messages, and the like). The service may be interacted with using different types of input/output. For example, a user may use touch input, hardware based input, speech input, and the like. The service may provide speech output that combines pre-recorded speech and/or synthesized speech. Functionality of one or more of the services/applications provided by service 1010 may also be configured as a client/server based application. Although system 1000 shows a service relating to a productivity application, other services/applications may be configured.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with productivity applications.

As illustrated, touch screen input device/display 1050 and smart phone 1030 shows exemplary displays 1052/1032 showing the use of an application. Display 1052 illustrates a user performing a gesture. Data may be stored on a device (e.g. smart phone 1030, slate 1050 and/or at some other location (e.g. network data store 1045). The applications used by the devices may be client based applications, server based applications, cloud based applications and/or some combination.

Secret manager 26 is configured to perform operations relating to managing secrets as described herein. While manager 26 is shown within service 1010, the functionality of the manager may be included in other locations (e.g. on one or more other computing devices).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
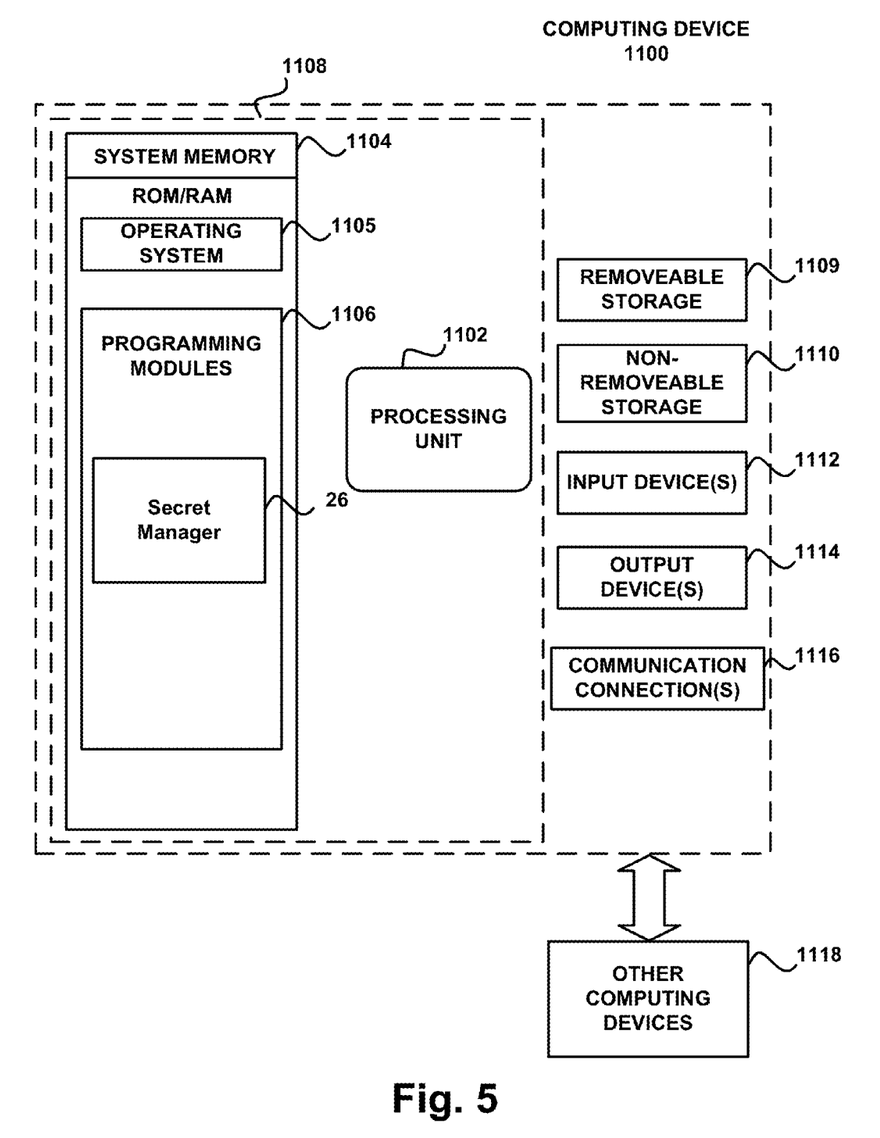
FIGS. 5-7 and the associated descriptions provide a discussion of a variety of operating environments in which embodiments of the invention may be practiced.
Figure 6A:
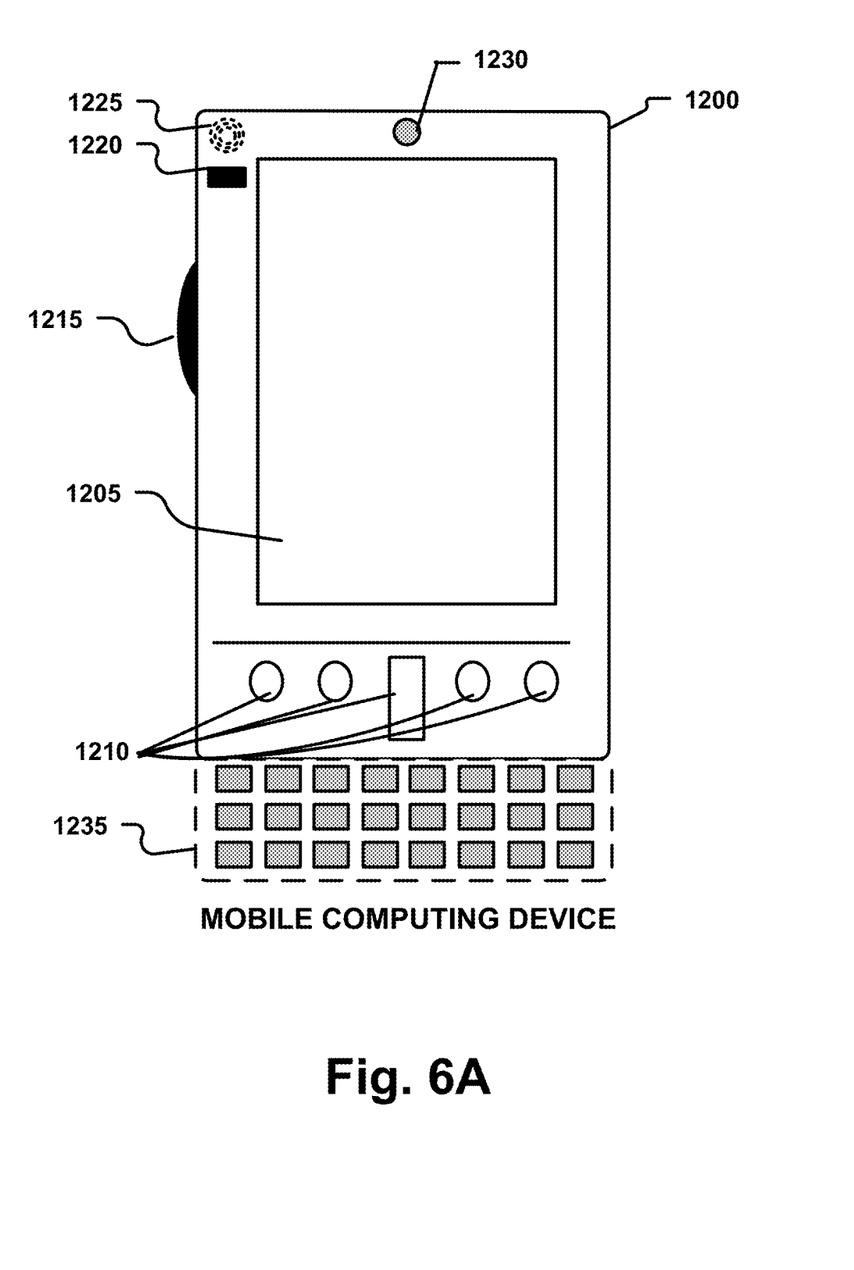
Figure 6B:
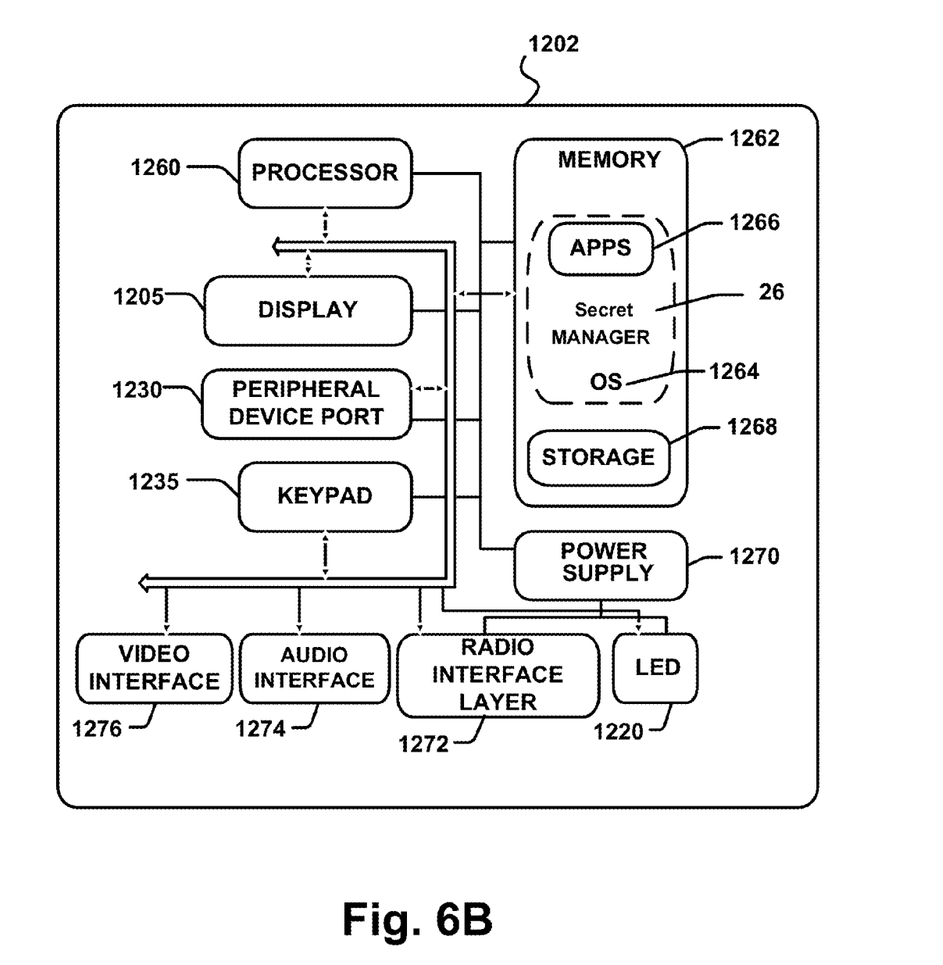
Figure 7:
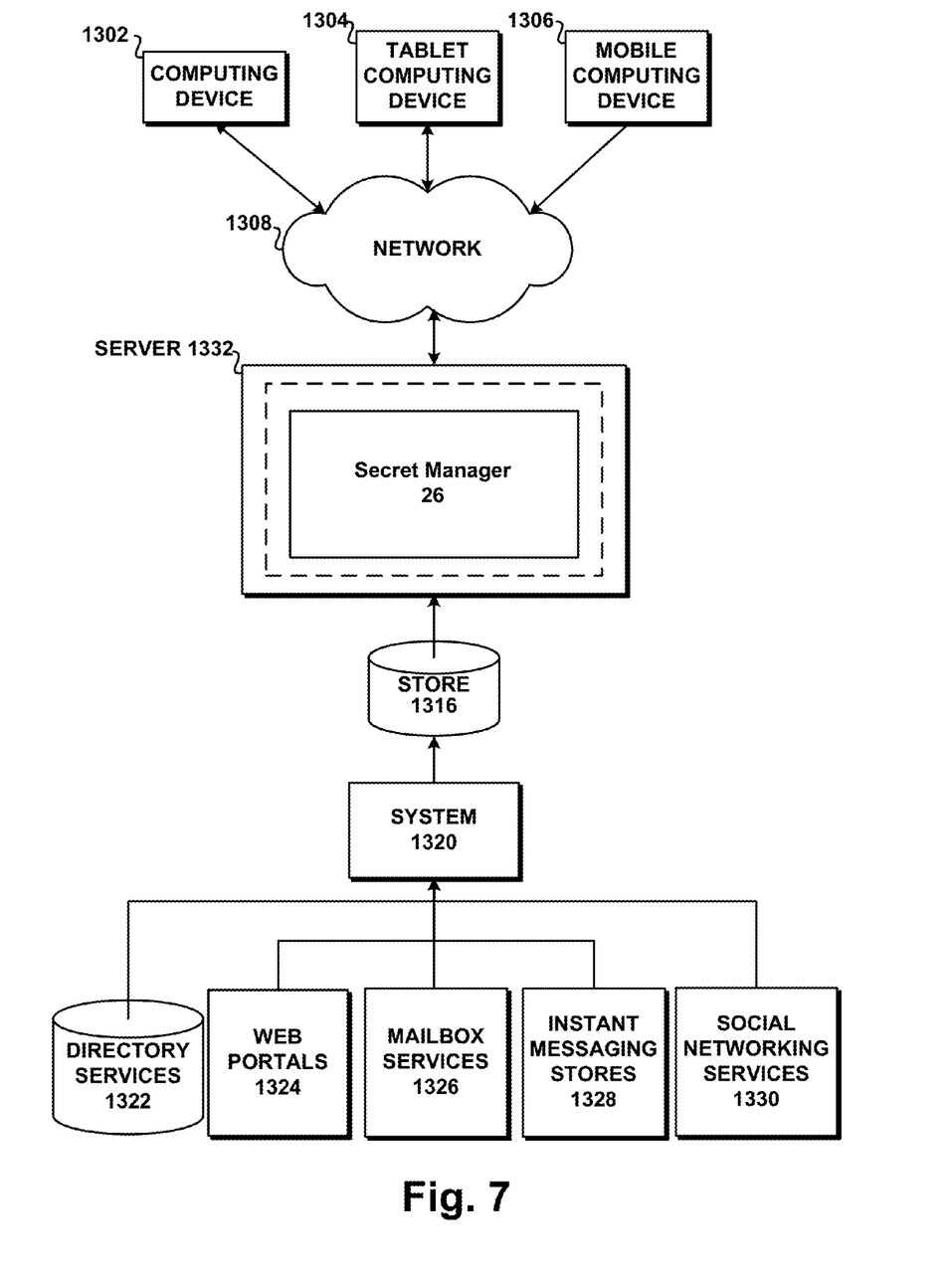

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a secret manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the secret manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications.

These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 6B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for secret management.

Components managed via the secret manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to creating an application using shared code across different platforms. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for secret management, comprising: automatically generating a first secret used to access a resource; securely storing the first secret with other secrets; determining when a request is made from a user for the first secret; providing the first secret to access the resource a single time; determining when the first secret has expired; determining when the user is authorized to access the resource by using a lock-box to analyze a plurality of predefined conditions, wherein the lock-box evaluates user authorization at predetermined intervals, wherein using a lock-box that analyzes a plurality of predefined conditions, further comprises revoking the user authorization to access the resource; automatically generating a second secret to replace the first secret in response to determining that the first secret has expired and the user is authorized to access the resource; and replacing the first secret with the second secret.

2. The method of claim 1, further comprising logging each request and use of the secrets.

3. The method of claim 1, wherein determining when the first secret has expired comprises determining when an operation involving the resource has been completed.

4. The method of claim 1, wherein determining when the first secret has expired comprises determining when the first secret has been used to log into a machine.

5. The method of claim 1, further comprising automatically replacing at least a portion of the stored secrets with automatically generated replacement secrets.

6. The method of claim 1, further comprising generating a first secret for each machine in a service upon deployment of the machine in the service.

7. The method of claim 1, wherein the first secret is used a single time and then automatically replaced with the second secret.

8. A computer-readable storage device storing computer-executable instructions for secret management, comprising:
automatically generating a first secret used to access a resource;
securely storing the first secret with other secrets;
determining when a request is made from a user for the first secret; providing the first secret to access the resource a single time;
determining when the first secret has expired;
determining when the user is authorized to access the resource by using a lock-box that analyzes a plurality of predefined conditions, wherein the lock-box evaluates user authorization at predetermined intervals, wherein using a lock-box that analyzes a plurality of predefined conditions, further comprises revoking the user authorization to access the resource;
automatically generating a second secret to replace the first secret in response to determining at least one of: the first secret has expired and the user is authorized to have access to the resource; and
replacing the first secret with the second secret.

9. The computer-readable storage device of claim 8, further comprising logging each request and use of the secrets.

10. The computer-readable storage device of claim 8, wherein generating the second secret comprises determining when the user has accessed the resource.

11. The computer-readable storage device of claim 8, wherein determining when the first secret has expired comprises determining when an operation involving the resource has been completed.

12. The computer-readable storage device of claim 8, further comprising automatically replacing at least a portion of the stored secrets with automatically generated replacement secrets in response to a determined security breach.

13. The computer-readable storage device of claim 8, further comprising generating a first secret for each machine in a service upon deployment of the machine in the service.

14. The computer-readable storage device of claim 8, wherein the first secret is used a single time and then automatically replaced with the second secret.

15. A system for secret management, comprising:
- a processor and a memory;
- an operating environment executing using the processor; and
- a secret manager that is configured to perform actions comprising:
  - automatically generating a first secret used to access a resource;
  - securely storing the first secret with other secrets;
  - determining when a request is made from a user for the first secret;
  - providing the first secret to access the resource a single time;
  - determining when the first secret has expired;
  - determining when the user is authorized to access the resource by using a lock-box that analyzes a plurality of predefined conditions, wherein the lock-box evaluates user authorization at predetermined intervals, wherein using a lock-box that analyzes a plurality of predefined conditions, further comprises revoking the user authorization to access the resource;
  - automatically generating a second secret to replace the first secret in response to determining at least one of: the first secret has expired and the user is authorized to have access to the resource; and
  - replacing the first secret with the second secret.

16. The system of claim 15, further comprising logging each request and use of the secrets.

17. The system of claim 15, wherein generating the second secret comprises determining when the user has accessed the resource.

18. The system of claim 15, wherein determining when the first secret has expired comprises determining when an operation involving the resource has been completed.

19. The method of claim 1, wherein using a lock-box that analyzes a plurality of predefined conditions, further comprises assigning an expiration interval to the user authorization.

* * * * *